UNITED STATES PATENT OFFICE.

SIGMUND LUFT, OF MAYWOOD, ILLINOIS.

FOOD PRODUCT.

1,380,815.   Specification of Letters Patent.   Patented June 7, 1921.

No Drawing.   Application filed July 7, 1920. Serial No. 394,469.

*To all whom it may concern:*

Be it known that I, SIGMUND LUFT, a citizen of the United States, residing at Maywood, in the county of Cook and State of Illinois, have invented certain new and useful Improvements in Food Products, of which the following is a specification, reference being had to the accompanying drawings, and to the reference characters marked thereon, which form a part of this specification.

This invention relates to improvements in dry, condensed, preserved food products, and more particularly to a condensed soup product and the process of making the same.

For a variety of reasons, during recent years, there has been a great decrease in the amount of soup prepared from the original raw materials in the home, and a corresponding increase in the use of canned soups which require merely the addition of boiling water in order to prepare them for the table. Dry condensed soups have also been used to some extent in the form of what are known as bouillon cubes consisting of the water soluble components of meats and vegetables and to a lesser extent in the form of mixtures of fat, ground cereals or vegetables and flavoring materials. It is to the latter class that my new product more properly belongs, although it is also useful for other purposes, such, for example, as the preparation of sauces and gravies in which cases the product differs from the soup only in its content of water.

Among the objections to products in the class mentioned which have heretofore prevented their more general use, I mention their lack of palatability, their poor keeping qualities, a tendency to become rancid, and also the fact that a comparatively long period of cooking is necessary in order to bring them to a condition of edibility, all of which objections I overcome in my present invention.

In making my product, I proceed as follows: I take grain or other starchy material, preferably (though not necessarily) in a ground state, and place it in a heated vessel provided with some means of agitating the contents. The temperature of the vessel is gradually raised to a roasting temperature while the contents are kept continually in motion in order that every particle shall have substantially the same degree of heat treatment. This heat treatment is continued in all cases until the product is substantially free from moisture and the grain or other starchy material has been so modified by the heat as to render it transformable into an edible state by treatment with hot water for a much less time than would be necessary for the same material in its raw state. The time and temperature necessary, obviously, will vary for different products.

I have found, for example, that with corn meal a satisfactory product is obtained when it is gradually heated to 300° F. during 40 minutes and then maintained at a temperature of 300° F. for 20 minutes. In general, I find it advisable to heat treat the material to a point just short of that at which its flavor is impaired by the production of an excessive quantity of bodies of the "caramel" class. At that point grain or other starchy material has acquired the maximum keeping quality and the optimum flavor. It has also been so modified chemically that it can be cooked to a condition of edibility much more quickly than if it were raw.

After the completion of the roasting step of my process, the roasted product is allowed to cool somewhat but not to a sufficiently low temperature so that moisture will begin to condense on its surface nor be reabsorbed by it, since it is of great importance to maintain the mass in substantially that state of desiccation which is produced as one of the results of the roasting process. To this hot grain,—while in a state of agitation, I add approximately one-third of its weight of a pure food fat, such as beef suet, preferably in melted state, and I continue the agitation until the particles of the roasted starchy material have become thoroughly impregnated with the fat. I then add seasoning such as salt, spices or desiccated vegetables, or extracts of meats or vegetables, all of which should be of such low moisture content, or in such small quantity, as not to increase materially the moisture content of the grain and fat mixture.

In some cases, it is desirable before the mass cools, to compress it into tablet form by means of any suitable pressing or stamping machine. The cooled product whether in tablet form or not, will then be suitably wrapped in waxed paper, or tin foil, and placed in a suitable container for commercial handling. It may be eaten as packed, or in liquid form by the addition of water in a suitable quantity and temperature, to make it a delicious and nutritious article of food.

This product, thus prepared, has certain advantages not found in any similar product. From the roasted grain it gains an extremely appetizing flavor peculiar to itself since I am the first, so far as I can learn, to utilize a roasted starchy material in a soup mixture.

The roasting of the grain also renders this product easy to prepare for the table since the grain is practically completely cooked in the roasting process and the mixture therefore requires only a few minutes' treatment in water of the proper quantity and temperature to transform it into an excellent soup, gravy or sauce.

That decomposition of cereal products which results in the condition known as rancidity has been found to be due to the combined action of light, heat and moisture on the oily constituents of the cereals. The roasting step of my process removes the moisture and by impregnating this thoroughly dry grain with a moisture resisting material such as a food fat of a class which does not itself develop rancidity, I have been able to maintain the mixture for long periods—several years in fact,—in a sweet and edible state without special precautions such as packing in tin or otherwise protecting the product from contact with air and moisture.

In consequence of these advantages just described which are inherent in my new process and product, I believe that I have solved the problem of preparing a cheap, palatable and nutritious soup product having permanent keeping qualities even when packed in paper cartons or similar cheap containers.

There are many combinations of food materials which may be made by the means and for the purpose herein described, and there are obviously many uses for the product in addition to these few which I have mentioned specifically. I do not therefore, desire my invention limited to the material or uses hereinabove specified, except as stated in the subjoined claims.

I claim as my invention:

1. A process of preparing a food product consisting in roasting a starchy material and impregnating it with fat while maintaining it in substantially dry state.

2. A process of preparing a dry soup product which consists in roasting a starchy material, impregnating it with fat while maintaining it in a substantially dry state and subsequently adding seasoning materials in such quantity and of such water content as not to change, substantially, the percentage of water in the mass to any material extent.

3. A substantially dry food product comprising starchy material which has been roasted to a point short of complete caramelization, with the removal of substantially all the moisture, and while in such condition, impregnated with fat to prevent the reabsorption of moisture.

4. A substantially dry soup product comprising seasoning and a starchy material roasted to a point short of complete caramelization, with the removal of substantially all moisture, and impregnated with fat to prevent reabsorption of moisture.

5. A substantially dry soup product which consists of a starchy material roasted to a point short of complete caramelization, with the removal of substantially all moisture, and, while maintaining it in a substantially dry state, impregnated with fat to prevent reabsorption of moisture, and subsequently added seasoning material, the product being quickly transformable into soup by treatment with water.

In testimony that I claim the foregoing as my invention I affix my signature, in the presence of two witnesses, this 1st day of July, 1920.

SIGMUND LUFT.

Witnesses:
B. L. MACGREGOR,
L. A. PERLOW.